(12) United States Patent
Thornberry et al.

(10) Patent No.: US 9,183,538 B2
(45) Date of Patent: Nov. 10, 2015

(54) METHOD AND SYSTEM FOR QUICK SQUARE ROOF REPORTING

(75) Inventors: Chris T. Thornberry, Indianapolis, IN (US); Dale R. Thornberry, Carmel, IN (US)

(73) Assignee: Pictometry International Corp., Rochester, NY (US)

( * ) Notice: Subject to any disclaimer, the term of this patent is extended or adjusted under 35 U.S.C. 154(b) by 334 days.

(21) Appl. No.: 13/424,054

(22) Filed: Mar. 19, 2012

(65) Prior Publication Data
US 2013/0246204 A1    Sep. 19, 2013

(51) Int. Cl.
G06Q 30/00    (2012.01)
G06Q 10/10    (2012.01)

(52) U.S. Cl.
CPC .................................. *G06Q 10/10* (2013.01)

(58) Field of Classification Search
CPC .................. G06Q 30/0621; G06Q 30/0641
USPC ........................ 705/26.1, 26.5, 27.1
See application file for complete search history.

(56) References Cited

U.S. PATENT DOCUMENTS

| | | | |
|---|---|---|---|
| 2,273,876 A | 2/1942 | Lutz et al. | |
| 3,153,784 A | 10/1964 | Petrides et al. | |
| 3,594,556 A | 7/1971 | Edwards | |
| 3,614,410 A | 10/1971 | Bailey | |
| 3,621,326 A | 11/1971 | Hobrough | |
| 3,661,061 A | 5/1972 | Tokarz | |
| 3,716,669 A | 2/1973 | Watanabe et al. | |
| 3,725,563 A | 4/1973 | Woycechowsky | |
| 3,864,513 A | 2/1975 | Halajian et al. | |
| 3,866,602 A | 2/1975 | Furihata | |
| 3,877,799 A | 4/1975 | O'Donnell | |
| 4,015,080 A | 3/1977 | Moore-Searson | |
| 4,044,879 A | 8/1977 | Stahl | |
| 4,184,711 A | 1/1980 | Wakimoto | |
| 4,240,108 A | 12/1980 | Levy | |
| 4,281,354 A | 7/1981 | Conte | |
| 4,344,683 A | 8/1982 | Stemme | |
| 4,360,876 A | 11/1982 | Girault et al. | |
| 4,382,678 A | 5/1983 | Thompson et al. | |

(Continued)

FOREIGN PATENT DOCUMENTS

| AT | 331204 T | 7/2006 |
|---|---|---|
| BR | 0316110 | 9/2005 |

(Continued)

OTHER PUBLICATIONS http://www.eagleview.com/Portals/0/PortalContent/EagleView-iPhone-Application-Guide.pdf, 2011.*

(Continued)

*Primary Examiner* — Matthew Zimmerman
(74) *Attorney, Agent, or Firm* — Dunlap Codding, P.C.

(57) ABSTRACT

A set of instructions stored on one or more computer readable medium for running on one or more computer systems is described herein. The set of instructions generally may include instructions for identifying a geographic location of a roof, instructions for determining contact information of one or more contractors within a region of interest of the geographic location of the roof, instructions for determining a footprint of the roof, instructions for determining predominant pitch of the roof, and/or instructions for determining an estimated roofing area based on the predominant pitch and the footprint of the roof.

18 Claims, 9 Drawing Sheets

Slope Factor Chart

| Pitch of Roof | 1:12 | 2:12 | 3:12 | 4:12 | 5:12 | 6:12 | 7:12 | 8:12 | 9:12 | 10:12 | 11:12 | 12:12 |
|---|---|---|---|---|---|---|---|---|---|---|---|---|
| Slope Factor | 1.0035 | 1.0138 | 1.0308 | 1.0541 | 1.0833 | 1.1180 | 1.1577 | 1.2019 | 1.2500 | 1.3017 | 1.3566 | 1.4142 |

(A) x (Slope Factor) = (B)

(56) References Cited

U.S. PATENT DOCUMENTS

| | | |
|---|---|---|
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,348,895 B2 | 3/2008 | Lagassey |
| 7,424,133 B2 | 9/2008 | Schultz et al. |
| 7,509,241 B2 | 3/2009 | Guo |
| 7,728,833 B2 | 6/2010 | Verma |
| 7,832,267 B2 | 11/2010 | Woro |
| 7,844,499 B2 | 11/2010 | Yahiro |
| 8,078,396 B2 | 12/2011 | Meadow |
| 8,078,436 B2* | 12/2011 | Pershing et al. ........... 703/2 |
| 8,209,152 B2* | 6/2012 | Pershing ................... 703/1 |
| 8,401,222 B2* | 3/2013 | Thornberry et al. ........ 382/100 |
| 8,705,843 B2 | 4/2014 | Lieckfeldt |
| 2002/0041328 A1 | 4/2002 | LeCompte et al. |
| 2002/0041717 A1 | 4/2002 | Murata et al. |
| 2002/0087332 A1* | 7/2002 | Como ...................... 705/1 |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088362 A1 | 5/2003 | Melero et al. |
| 2003/0214585 A1 | 11/2003 | Bakewell |
| 2004/0105090 A1 | 6/2004 | Schultz et al. |
| 2004/0167709 A1 | 8/2004 | Smitherman et al. |
| 2005/0073241 A1 | 4/2005 | Yamauchi et al. |
| 2005/0088251 A1 | 4/2005 | Matsumoto |
| 2005/0169521 A1 | 8/2005 | Hel-Or |
| 2006/0028550 A1 | 2/2006 | Palmer et al. |
| 2006/0036513 A1 | 2/2006 | Whatley et al. |
| 2006/0092043 A1 | 5/2006 | Lagassey |
| 2006/0238383 A1 | 10/2006 | Kimchi et al. |
| 2006/0250515 A1 | 11/2006 | Koseki et al. |
| 2007/0024612 A1 | 2/2007 | Balfour |
| 2007/0046448 A1 | 3/2007 | Smitherman |
| 2007/0237420 A1 | 10/2007 | Steedly et al. |
| 2008/0120031 A1 | 5/2008 | Rosenfeld et al. |
| 2008/0123994 A1 | 5/2008 | Schultz et al. |
| 2009/0177458 A1 | 7/2009 | Hochart et al. |
| 2009/0208095 A1 | 8/2009 | Zebedin |
| 2009/0259568 A1 | 10/2009 | Lee |
| 2009/0304227 A1 | 12/2009 | Kennedy et al. |
| 2010/0110074 A1* | 5/2010 | Pershing ................... 345/423 |
| 2010/0114537 A1* | 5/2010 | Pershing ................... 703/1 |
| 2010/0179787 A2* | 7/2010 | Pershing et al. ............ 702/156 |
| 2010/0296693 A1* | 11/2010 | Thornberry et al. ........ 382/100 |
| 2011/0033110 A1 | 2/2011 | Shimamura et al. |
| 2012/0179431 A1* | 7/2012 | Labrie et al. ............... 703/1 |

(56) References Cited

U.S. PATENT DOCUMENTS

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| EP | 1010966 | 2/1999 |
| EP | 1180967 | 2/2002 |
| EP | 1696204 | 8/2006 |
| JP | 2001-306667 A | 11/2001 |
| JP | 2002-123589 A | 4/2002 |
| JP | 2003/317089 A | 11/2003 |
| JP | 2006-031087 A | 2/2006 |
| MX | PA05004987 | 2/2006 |
| WO | WO99/18732 | 4/1999 |
| WO | WO/00/53090 | 9/2000 |
| WO | WO/2004/044692 | 5/2004 |
| WO | WO/2005/088251 | 9/2005 |
| WO | WO/2008/028040 | 3/2008 |

OTHER PUBLICATIONS

Jan. 2010—http://aims.jocogov.org/Resources/Pictometry_Resources/POLQuickStart.pdf.*
Ackermann, Prospects of Kinematic GPS Aerial Triangulation, ITC Journal, 1992.
Ciampa, John A., "Pictometry Digital Video Mapping", SPIE, vol. 2598, pp. 140-148, 1995.
Ciampa, J. A., Oversee, Presented at Reconstruction After Urban earthquakes, Buffalo, NY, 1989.
Dunford et al., Remote Sensing for Rural Development Planning in Africa, The Journal for the International Institute for Aerial Survey and Earth Sciences, 2:99-108, 1983.
Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.
Konecny, G., "Issues of Digital Mapping", Leibniz University Hannover, Germany, GIS Ostrava 2008, Ostrava Jan. 27-30, 2008, pp. 1-8.
Konecny, G., "Analytical Aerial Triangulation with Convergent Photography", Department of Surveying Engineering, University of New Brunswick, pp. 37-57, 1966.
Konecny, G., "Interior Orientation and Convergent Photography", Photogrammetric Engineering, pp. 625-634, 1965.
Graham, Lee A., "Airborne Video for Near-Real-Time Vegetation Mapping", Journal of Forestry, 8:28-32, 1993.
Graham, Horita TRG-50 SMPTE Time-Code Reader, Generator, Window Inserter, 1990.
Hess, L.L, et al., "Geocoded Digital Videography for Validation of Land Cover Mapping in the Amazon Basin", International Journal of Remote Sensing, vol. 23, No. 7, pp. 1527-1555, 2002.
Hinthorne, J., et al., "Image Processing in the Grass GIS", Geoscience and Remote Sensing Symposium, 4:2227-2229, 1991.
Imhof, Ralph K., "Mapping from Oblique Photographs", Manual of Photogrammetry, Chapter 18, 1966.
Jensen, John R., Introductory Digital Image Processing: A Remote Sensing Perspective, Prentice-Hall, 1986; 399 pages.
Lapine, Lewis A., "Practical Photogrammetric Control by Kinematic GPS", GPS World, 1(3):44-49, 1990.
Lapine, Lewis A., Airborne Kinematic GPS Positioning for Photogrammetry—The Determination of the Camera Exposure Station, Silver Spring, MD, 11 pages, at least as early as 2000.
Linden et al., Airborne Video Automated Processing, US Forest Service Internal report, Fort Collins, CO, 1993.
Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.
Myhre et al., "Airborne Videography—A Potential Tool for Resource Managers"—Proceedings: Resource Technology 90, 2nd International Symposium on Advanced Technology in Natural Resource Management, 5 pages, 1990.
Myhre et al., Aerial Photography for Forest Pest Management, Proceedings of Second Forest Service Remote Sensing Applications Conference, Slidell, Louisiana, 153-162, 1988.
Myhre et al., "Airborne Video Technology", Forest Pest Management/Methods Application Group, Fort Collins, CO, pp. 1-6, at least as early as Jul. 30, 2006.
Norton-Griffiths et al., 1982. "Sample surveys from light aircraft combining visual observations and very large scale color photography". University of Arizona Remote Sensing Newsletter 82-2:1-4.
Norton-Griffiths et al., "Aerial Point Sampling for Land Use Surveys", Journal of Biogeography, 15:149-156, 1988.
Novak, Rectification of Digital Imagery, Photogrammetric Engineering and Remote Sensing, 339-344, 1992.
Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.
Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.
Slaymaker, et al., "Cost-effective Determination of Biomass from Aerial Images", Lecture Notes in Computer Science, 1737:67-76, http://portal.acm.org/citation.cfm?id=648004.743267&coll=Guide&dl=, 1999.
Slaymaker, et al., "A System for Real-time Generation of Geo-referenced Terrain Models", 4232A-08, SPIE Enabling Technologies for Law Enforcement Boston, MA, ftp://vis-ftp.cs.umass.edu/Papers/schultz/spie2000.pdf, 2000.
Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.
Slaymaker, et al., "Calculating Forest Biomass With Small Format Aerial Photography, Videography and a Profiling Laser", In Proceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.
Tomasi et al., "Shape and Motion from Image Streams: a Factorization Method" —Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", MicroImages, Inc., Lincoln, NE, 1 page, Dec. 1992.

(56) References Cited

OTHER PUBLICATIONS

Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. Dec. 12, 2000.
Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "GPS and Inertial Navigation Delivering", Sep. 2005, GEOconnexion International Magazine, p. 52-53, Sep. 2005.
"POS AV" APPLANIX, Product Outline, airborne@applanix.com, 3 pages, Mar. 28, 2007.
POSTrack, "Factsheet", APPLANIX, Ontario, Canada, www.applanix.com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "LIDAR Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung and Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(I): I-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach®Online Roof Evaluation Standard Delivery Format and 3D Data File: Document Version 01.00.2002 with publication in 2002, 13 pages.
Noronha et al., "Detection and Modeling of Building from Multiple Aerial Images," Institute for Robotics and Intelligent Systems, University of Southern California, Nov. 27, 2001, 32 pages.
Applicad Reports dated Nov. 25, 1999-Mar. 9, 2005, 50 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
Korean Intellectual Property Office, International Search Report and Written Opinion, Mail Date Jul. 10, 2013.

\* cited by examiner

Slope Factor Chart

| Pitch of Roof | 1:12 | 2:12 | 3:12 | 4:12 | 5:12 | 6:12 | 7:12 | 8:12 | 9:12 | 10:12 | 11:12 | 12:12 |
|---|---|---|---|---|---|---|---|---|---|---|---|---|
| Slope Factor | 1.0035 | 1.0138 | 1.0308 | 1.0541 | 1.0833 | 1.1180 | 1.1577 | 1.2019 | 1.2500 | 1.3017 | 1.3566 | 1.4142 |

(A) x (Slope Factor) = (B)

FIG. 8 (Continued)

METHOD AND SYSTEM FOR QUICK SQUARE ROOF REPORTING

CROSS-REFERENCE TO RELATED APPLICATIONS

Not Applicable.

BACKGROUND

Residential and/or commercial property owners approaching a major roofing project may be unsure of the amount of material needed and/or the next step in completing the project. Generally, such owners contact one or more contractors for a site visit. Each contractor must physically be present at the site of the structure in order to make a determination on material needs and/or time. The time and energy for providing such an estimate becomes laborious and may be affected by contractor timing, weather, contractor education, and the like. Estimates may be varied even between contractors in determination of estimated square footage causing variance in supply ordering as well. Additionally, measuring an actual roof may be costly and potentially hazardous—especially with steeply pitched roofs. Completion of a proposed roofing project may depend on ease in obtaining a simplified roofing estimate and/or obtaining reputable contractors for the roofing project.

Images are currently being used to measure objects and structures within the images, as well as to be able to determine geographic locations of points within the image when preparing estimates for a variety of construction projects, such as roadwork, concrete work, and roofing. Estimating construction projects using software may increase speed at which an estimate can be prepared, and may reduce labor and fuel costs associated with on-site visits.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION OF INVENTIVE CONCEPT

Figure 1:
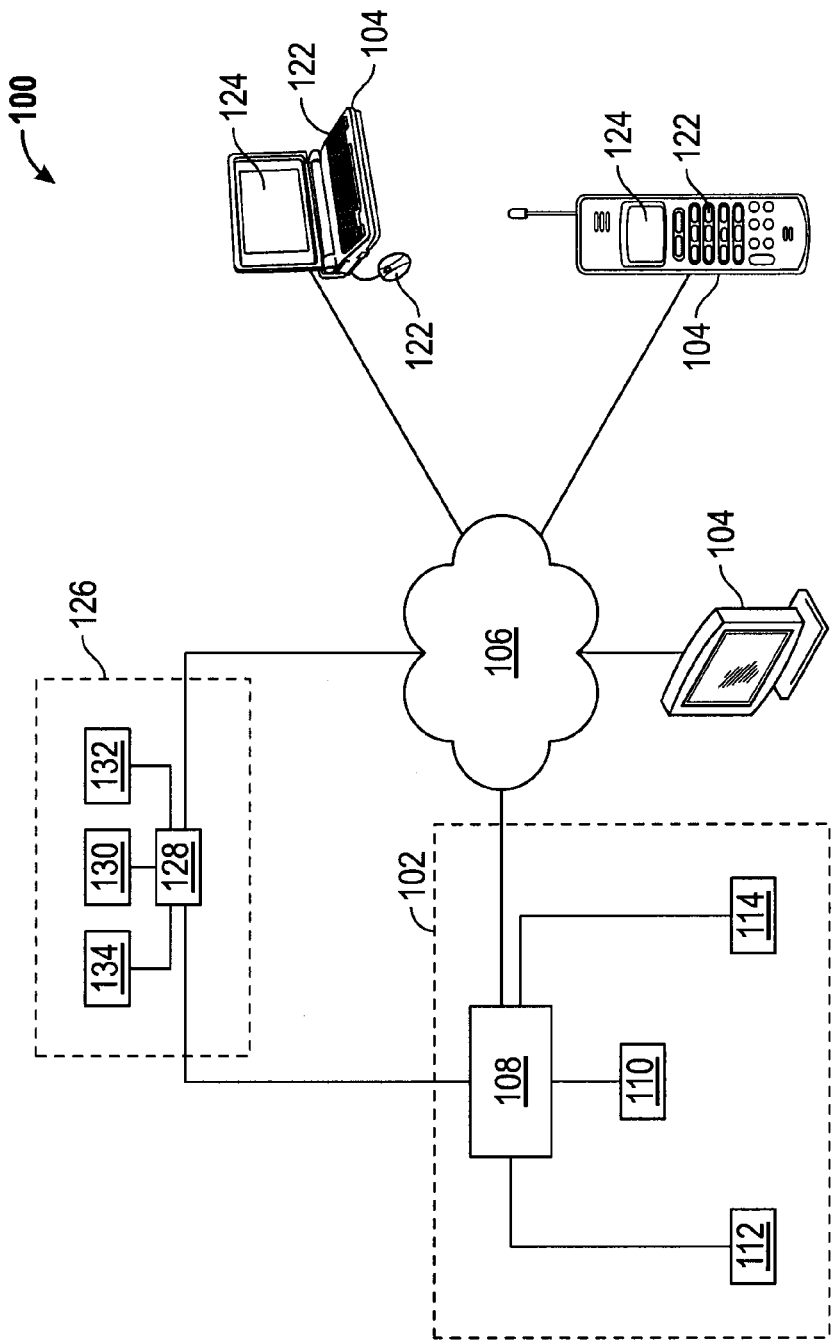
FIG. 1 is a schematic diagram of an embodiment of a roof estimator reporting system according to the instant disclosure.

Before explaining at least one embodiment of the inventive concept disclosed herein in detail, it is to be understood that the inventive concept is not limited in its application to the details of construction and the arrangement of the components or steps or methodologies set forth in the following description or illustrated in the drawings. The inventive concept disclosed herein is capable of other embodiments or of being practiced or carried out in various ways. Also, it is to be understood that the phraseology and terminology employed herein is for the purpose of description and should not be regarded as limiting in any way.

In the following detailed description of embodiments of the inventive concept, numerous specific details are set forth in order to provide a more thorough understanding of the inventive concept. It will be apparent to one of ordinary skill in the art, however, that the inventive concept within the disclosure may be practiced without these specific details. In other instances, well-known features have not been described in detail to avoid unnecessarily complicating the instant disclosure.

Referring now to the drawings, and in particular to FIG. 1, shown therein and designated by a reference numeral 100 is an exemplary computer system 100 constructed in accordance with the present disclosure. The system 100 can be a system or systems that are able to embody and/or execute the logic of the processes described herein. The logic embodied in the form of software instructions, or firmware may be executed on any appropriate hardware which may be a dedicated system or systems.

As used herein, the terms "network-based", "cloud-based" and any variations thereof, are intended to include the provision of configurable computational resources on demand via interfacing with a computer and/or computer network, with software and/or data at least partially located on the computer and/or computer network, by pooling processing power of two or more networked processors.

As used herein, the terms "comprises", "comprising", "includes", "including", "has", "having", or any other variation thereof, are intended to be non-exclusive inclusions. For example, a process, method, article, or apparatus that comprises a set of elements is not limited to only those elements but may include other elements not expressly listed or even inherent to such process, method, article, or apparatus.

As used in the instant disclosure, the terms "provide", "providing", and variations thereof comprise displaying or providing for display a webpage (e.g., roofing webpage) to one or more user terminals interfacing with a computer and/or computer network(s) and/or allowing the one or more user terminal(s) to participate, such as by interacting with one or more mechanisms on a webpage (e.g., roofing webpage) by sending and/or receiving signals (e.g., digital, optical, and/or the like) via a computer network interface (e.g., Ethernet port, TCP/IP port, optical port, cable modem, and combinations thereof). A user may be provided with a web page in a web browser, or in a software application, for example.

As used herein, the term "roof request", "roofing request", "roofing order", and any variations thereof may comprise a feature of the graphical user interface or a feature of a software application, allowing a user to indicate to a host system that the user wishes to place an order, such as by interfacing with the host system over a computer network and exchanging signals (e.g., digital, optical, and/or the like), with the host system using a network protocol, for example. Such mechanism may be implemented with computer executable code executed by one or more processors, for example, with a button, a hyperlink, an icon, a clickable symbol, and/or combinations thereof, that may be activated by a user terminal interfacing with the at least one processor over a computer network, for example.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, the use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearance of the phrase "in one embodiment" in various places in the specification are not necessarily all referring to the same embodiment.

Referring now to FIG. 1, shown therein is an exemplary embodiment of a roof estimator reporting system 100 according to the instant disclosure. The system 100 comprises two or more host systems 102 and 126 interfacing and/or communicating with one or more user terminals 104 via a network 106.

The one or more user terminals 104 may be implemented as a personal computer, a smart phone, network-capable TV set, TV set-top box, a tablet, an e-book reader, a laptop computer, a desktop computer, a network-capable handheld device, a video game console, a server, a digital video recorder, a DVD-player, a Blu-Ray player and combinations thereof, for example. In an exemplary embodiment, the user terminal 104 may comprise an input device 122, an output device 124, a processor (not shown) capable of interfacing with the network 106, processor executable code (not shown), and a web browser capable of accessing a website and/or communicating information and/or data over a network, such as the network 106. As will be understood by persons of ordinary skill in the art, the one or more user terminals 104 may comprise one or more non-transient memories comprising processor executable code and/or software applications, for example.

The input device 122 may be capable of receiving information input from a user and/or other processor(s), and transmitting such information to the user terminal 104 and/or to the host system 102. The input device 122 may be implemented as a keyboard, a touchscreen, a mouse, a trackball, a microphone, a fingerprint reader, an infrared port, a slide-out keyboard, a flip-out keyboard, a cell phone, a PDA, a video game controller, a remote control, a fax machine, a network interface, and combinations thereof, for example.

The output device 124 may output information in a form perceivable by a user and/or other processor(s). For example, the output device 124 may be a server, a computer monitor, a screen, a touchscreen, a speaker, a website, a TV set, a smart phone, a PDA, a cell phone, a fax machine, a printer, a laptop computer, and combinations thereof. It is to be understood that in some exemplary embodiments, the input device 122 and the output device 124 may be implemented as a single device, such as, for example, a touchscreen or a tablet. It is to be further understood that as used herein the term user is not limited to a human being, and may comprise a computer, a server, a website, a processor, a network interface, a human, a user terminal, a virtual computer, and combinations thereof, for example.

The system 100 may include one or more host systems. For example, FIG. 1 illustrates system 100 having two host systems 102 and 126. The host systems 102 and 126 may be partially or completely network-based or cloud based, and not necessarily located in a single physical location. Each of the host systems 102 and 126 may further be capable of interfacing and/or communicating with the one or more user terminals 104 via the network 106, such as by exchanging signals (e.g., digital, optical, and/or the like) via one or more ports (e.g., physical or virtual) using a network protocol, for example. Additionally, each host system 102 and 126 may be capable of interfacing and/or communicating with other host systems directly and/or via the network 106, such as by exchanging signals (e.g., digital, optical, and/or the like) via one or more ports.

In some embodiments, host systems 102 and 126 may be independently controlled by separate entities. Host system 102 may be controlled by a first company and host system 126 may be controlled by a second company distinct from the first company. For example, host system 102 may be controlled by a roofing material supplier and host system 126 may be controlled by a roofing report company. The roofing material supplier may be a separate entity from the roofing report company.

The host system 102 may be referred to hereinafter as the "first host system" and the host system 126 may be referred to hereinafter as the "second host system". The first host system 102 may comprise one or more processors 108 working together, or independently to, execute processor executable code, one or more memories 110 capable of storing processor executable code, one or more input devices 112, and one or more output devices 114. Each element of the first host system 102 may be partially or completely network-based or cloud-based, and not necessarily located in a single physical location.

The one or more processors 108 may be implemented as a single or plurality of processors 108 working together, or independently to execute the logic as described herein. Exemplary embodiments of the one or more processors 108 include a digital signal processor (DSP), a central processing unit (CPU), a field programmable gate array (FPGA), a microprocessor, a multi-core processor, and/or combinations thereof. The one or more processors 108 may be capable of communicating with the one or more memories 110 via a path (e.g., data bus). The one or more processors 108 may be capable of communicating with the input devices 112 and the output devices 114.

The one or more processors 108 may be further capable of interfacing and/or communicating with the one or more user terminals 104 via the network 106. For example, the one or more processors 108 may be capable of communicating via the network 106 by exchanging signals (e.g., digital, optical, and/or the like) via one or more physical or virtual ports using a network protocol. It is to be understood that in certain embodiments using more than one processor 108, the one or more processors 108 may be located remotely from one another, located in the same location, or comprising a unitary multi-core processor (not shown). The one or more processors 108 may be capable of reading and/or executing processor executable code and/or of creating, manipulating, altering, and/or storing computer data structures into one or more memories 110.

The one or more memories 110 may be capable of storing processor executable code. Additionally, the one or more memories 110 may be implemented as a conventional non-transient memory 110, such as, for example, random access memory (RAM), a CD-ROM, a hard drive, a solid state drive, a flash drive, a memory card, a DVD-ROM, a floppy disk, an optical drive, and/or combinations thereof. It is to be understood that while one or more memories 110 may be located in the same physical location as the first host system 102, the one or more memories 110 may be located remotely from the first host system 102, and may communicate with the one or more processor 108 via the network 106. Additionally, when more than one memory 110 is used, a first memory 110 may be located in the same physical location as the first host system 102, and additional memories 110 may be located in a remote physical location from the first host system 102. The physical location(s) of the one or more memories 110 may be varied. Additionally, one or more memories 110 may be implemented as a "cloud memory" (i.e., one or more memory 110 may be partially or completely based on or accessed using the network 106).

The one or more input devices 112 may transmit data to the processors 108, and may be implemented as a keyboard, a mouse, a touchscreen, a camera, a cellular phone, a tablet, a smart phone, a PDA, a microphone, a network adapter, and/or combinations thereof. The input devices 112 may be located in the same physical location as the first host system 102, or may be remotely located and/or partially or completely network-based.

The one or more output devices 114 may transmit information from the processor 108 to a user, such that the information may be perceived by the user. For example, the output devices 114 may be implemented as a server, a computer monitor, a cell phone, a tablet, a speaker, a website, a PDA, a fax, a printer, a projector, a laptop monitor, and/or combinations thereof. The output device 114 may be physically co-located with the first host system 102, or may be located remotely from the first host system 102, and may be partially or completely network based (e.g., website). As used herein, the term "user" is not limited to a human, and may comprise a human, a computer, a host system, a smart phone, a tablet, and/or combinations thereof, for example.

The first host system 102 may directly communicate with the second host system 126 and/or communicate via network 106. Generally, the first host system 102 may include one or more processors 108 capable of executing a first set of processor executable code and the second host system 126 may include one or more processors 128 capable of executing a second set of processor executable code.

The second host system 126 may further comprise one or more memories 130 capable of storing processor executable code, one or more input devices 132, and one or more output devices 134. Each element of the second host system 126 may be partially or completely network-based or cloud based, and not necessarily located in a single physical location.

The one or more processors 128 may be implemented as a single or a plurality of processors 128 working together to execute the logic described herein. Exemplary embodiments of the one or more processors 128 include a digital signal processor (DSP), a central processing unit (CPU), a field programmable gate array (FPGA), a microprocessor, a multi-core processor, and/or combinations thereof. The one or more processors 128 may be capable of communicating with the one or more memories 130 via a path (e.g., data bus). The one or more processors 128 may be capable of communicating with the input devices 132 and the output devices 134.

The one or more processors 128 may be further capable of interfacing and/or communicating with the one or more user terminals 104 via the network 106. For example, the one or more processors 128 may be capable of communicating via the network 106 by exchanging signals (e.g., digital, optical, and/or the like) via one or more physical or virtual ports using a network protocol. It is to be understood that in certain embodiments using more than one processor 128, the one or more processors 128 may be located remotely from one another, located in the same location, or comprising a unitary multi-core processor (not shown). The one or more processors 128 may be capable of reading and/or executing processor executable code and/or of creating, manipulating, altering, and/or storing computer data structures into one or more memories 130.

The one or more memories 130 may be capable of storing processor executable code. Additionally, the one or more memories 130 may be implemented as a conventional non-transient memory 130, such as, for example, random access memory (RAM), a CD-ROM, a hard drive, a solid state drive, a flash drive, a memory card, a DVD-ROM, a floppy disk, an optical drive, and/or combinations thereof. It is to be understood that while one or more memories 130 may be located in the same physical location as the second host system 126, the one or more memories 130 may be located remotely from the second host system 126, and may communicate with the one or more processor 128 via the network 106. Additionally, when more than one memory 130 is used, a first memory 130 may be located in the same physical location as the second host system 126, and additional memories 130 may be located in a remote physical location from the second host system 126. The physical location(s) of the one or more memories 130 may be varied. Additionally, one or more memories 130 may be implemented as a "cloud memory" (i.e., one or more memory 130 may be partially or completely based on or accessed using the network 106).

The input devices 132 may transmit data to the processors 128, and may be implemented as a keyboard, a mouse, a touchscreen, a camera, a cellular phone, a tablet, a smart phone, a PDA, a microphone, a network adapter, and/or combinations thereof. The input devices 132 may be located in the same physical location as the second host system 126, or may be remotely located and/or partially or completely network-based.

The output devices 134 may transmit information from the processors 128 to a user, such that the information may be perceived by the user. For example, the output devices 134 may be implemented as a server, a computer monitor, a cell phone, a tablet, a speaker, a website, a PDA, a fax, a printer, a projector, a laptop monitor, and/or combinations thereof. The output devices 134 may be physically co-located with the second host system 126, or may be located remotely from the second host system 126, and may be partially or completely network based (e.g., website).

The network 106 may permit bi-directional communication of information and/or data between the first host system 102, the second host system 126 and/or user terminals 104. The network 106 may interface with the first host system 102, the second host system 126, and the user terminals 104 in a variety of ways. For example, the network 106 may interface by optical and/or electronic interfaces, and/or may use a plurality of network topographies and/or protocols including, but not limited to, Ethernet, TCP/IP, circuit switched paths, and/or combinations thereof. For example, the network 106 may be implemented as the World Wide Web (or Internet), a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and/or combinations thereof. Additionally, the network 106 may use a variety of network protocols to permit bi-directional interface and/or communication of data and/or information between the first host system 102, the second host system 126, and/or one or more user terminals 104.

Figure 2:
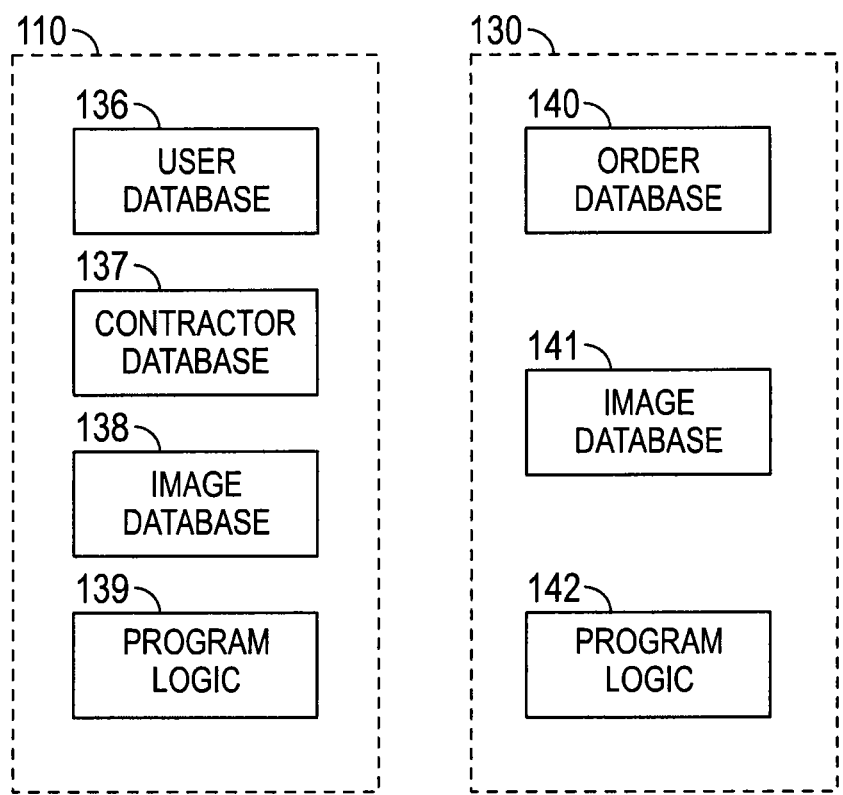
FIG. 2 is a block diagram of an embodiment of one or more memory according to the instant disclosure.

Referring to FIGS. 1 and 2, the one or more memories 110 may store processor executable code and/or information comprising a user database 136, a contractor database 137, a first image database 138 and program logic 139. The processor executable code may be stored as a data structure, such as a database and/or a data table, for example.

The user database 136 may include information about customers engaging with the first host system 102. For example, one or more customers may access the first host system 102 through the one or more user terminals 104. The first host system 102 may provide a roof request website to the user terminal 104. The roof request website may be directed by the one or more processors 108. The processor 108 may also direct the one or more customers to a login/registration portion of the website.

In some embodiments, customers may register a user profile with the first host system 102. The user profile may be created and/or stored in the user database 136 by the processor 108. For example, the customer may be prompted by the processor 108 to provide login credentials (e.g., username and/or password). Login credentials may allow the processor 108 to authenticate the customer against the user database 136. In this manner, the first host system 102 may access the user profile in the user database 136. The user profile may include information including, but not limited to, demographic information including, but not limited to, name, age, address, billing account information, username, password, behavioral information, experience, gender, and/or the like.

If user authentication is successful, the user profile may be accessed by the processor 108. If the user authentication fails, the customer may be returned to the login/registration page, where the customer may be prompted for a username and password again. Optionally, the processor 108 may block a customer from entering a username and/or password after a preset number of failed authentication attempts.

In some embodiments, customers may be prompted by the processor 108 to provide information for a user profile without registration and/or authentication using a username and/or password. The user profile may be created and/or stored in the user database 136 by the processor 108. For example, the processor 108 may prompt the customer to provide demographic information (e.g., name, address, billing account information, and the like), and store the information in a user profile for the customer using a unique customer identification.

The contractor database 137 may comprise information about roofing contractors within a given geographic location. Each roofing contractor may be associated with a contractor profile having information including, but not limited to, roofing contractor business name, roofing contractor owner name, address, experience level, age of contractor business, review information, and the like. In some embodiments, the contractor profile may include a geographical category assignment identification (ID). For example, the contractor profile may be assigned a numerical or alphabetical identification based on geographic location of the business.

In some embodiments, the contractor profile may include review information. The review information may include positive and/or negative feedback relating to each contractor. For example, the review information may be based on prior customer feedback of customers using the system 100. Review information may also be obtained from one or more outside databases (e.g., Yelp, Google review, and/or the like).

One or more contractors may provide a contractor profile via the first host system 102. For example, one or more contractors may access the roof review website of the first host system 102 via the user terminal 104. The processor 108 may direct the contractor via the roof review website to a login/registration portion of the website. If the contractor has previously registered with the first host system 102, the contractor may be prompted by the processor 108 to provide login credentials (e.g., username and/or password), which may allow the processor 108 to authenticate the contractor against the contractor database 137.

If the contractor is not registered with the first host system 102, the first host system 102 may prompt the contractor to provide information via the one or more user terminals 104 to create a contractor profile. Alternatively, the contractor profiles may be provided in the contractor database 137 without information provided by each contractor. For example, a user of the first host system 102 may provide information via the input device 112, the network 106, and/or the like, setting up a contractor profile without direct knowledge of the contractor.

The one or more memories 110 may include the image database 138. The image database 138 may store geo-referenced imagery. Such imagery may be represented by a single pixel map, and/or by a series of tiled pixel maps that when aggregated recreate the image pixel map. Imagery may include nadir, ortho-rectified and/or oblique geo-referenced images. The one or more processors 108 may provide the images via the image database 138 to customers at the one or more user terminals 104. Customers, using the user terminals 104, may provide geographic location information associated with a roof request using the geo-referenced images provided by the one or more processors 108. For example, a customer may be provided a geo-referenced image to validate the location of a structure (e.g., roof). In some embodiments, the customer may be able to select the structure (e.g., via a drag-and-drop user interface) to pinpoint a location of the structure within the image. Selection of the structure may provide location information (e.g., latitude/longitude coordinate, or and the like) of the structure to the first host system 102. For simplicity, the description will provide for a roof as the structure of interest. However, is should be apparent that other structures of buildings and/or landscapes may be used in accordance with the present disclosure.

The one or more memories 110 may further store processor executable code and/or instructions, which may comprise the program logic 139. The program logic 139 may comprise processor executable instructions and/or code, which when executed by the processor 108, may cause the processor 108 to generate, maintain, provide, and/or host a website providing one or more roofing requests, for example. The program logic 139 may further cause the processor 108 to collect user information and/or contractor information, create user profiles and/or contractor profiles, provide users one or more geo-referenced images, and allow one or more users to validate a location of the roof as described herein.

The one or more processors 108 may generate, maintain, or provide one or more roofing orders to the second host system 126. For example, the one or more processors 108 may provide the one or more roofing orders to the second host system 126 by copying information obtained and/or stored in one or more memories 110. The roofing orders may include contractor profile, user profile, user validated images, a unique ordering ID, and/or the like.

The one or more memories 130 of the second host system 126 may store processor executable code and/or information comprising an order database 140, a second image database 141 and the program logic 142. The processor executable code may be stored as a data structure, such as a database and/or a data table, for example.

The order database 140 may include information about a roofing order placed by a customer and copied by the first host system 102. For example, a roofing order may include contractor profile, user profile, user validated images, a unique ordering ID, and/or the like. The second host system 126 may access the order database 140 to provide a roofing report as described in detail herein.

The one or more memories 130 of the second host system 126 may also include a second image database 141. The second image database 141 may provide additional nadir, ortho-rectified, and/or oblique geo-referenced and/or non-geo-referenced images for use in providing a roofing report as described in detail herein. Alternatively, the image database 138 and the image database 141 may be the same database.

The one or more memories 130 of the second host system 126 may further store processor executable code and/or instructions, which may comprise program logic 142. The program logic 142 may comprise processor executable instructions and/or code, which when executed by the one or more processors 128, may cause the one or more processors 128 to generate, maintain, and/or provide a website or series of websites for providing roofing reports. The program logic 142 may further cause the one or more processors 128 to allow one or more users to participate in executing a roofing report via the input devices 132.

Figure 3:
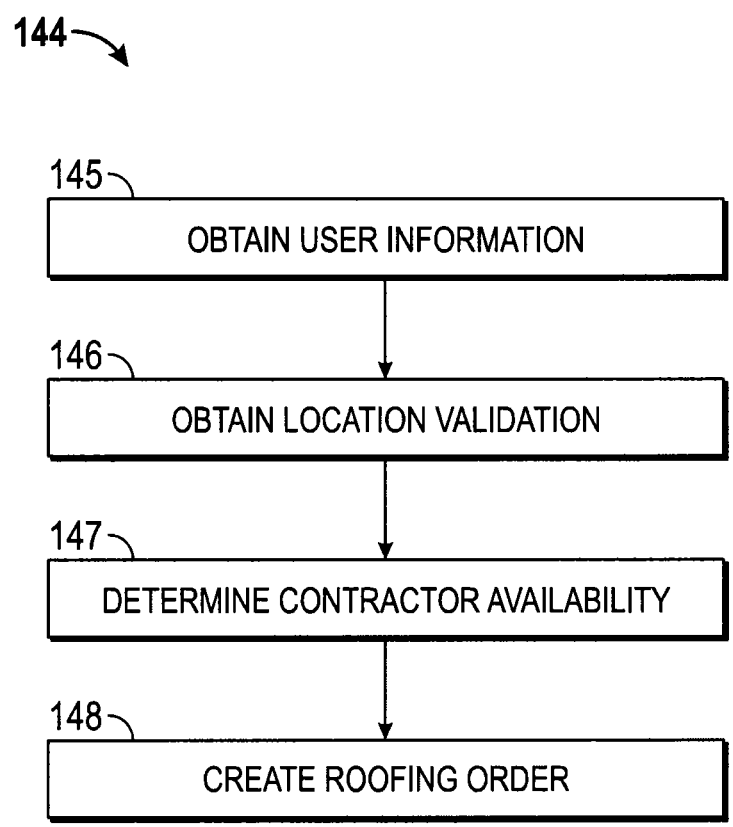
FIG. 3 is an exemplary embodiment of a program logic according to the instant disclosure.

Referring to FIG. 3, shown therein is an exemplary flow chart 144 of program logic 139 for creating a roof report order which may be used with the first host system 102 according to the instant disclosure. Program logic 139 may comprise executable code, which when executed by the one or more processors 108 may cause the one or more processors 108 to execute one or more of the following:

The program logic 139 may provide for one or more user terminals 104 interfacing with the processor 108 over the network 106 to provide one or more roofing request website pages allowing customers to place a roofing request order. Each order is generally a request of the customer to provide estimated square footage of a specific roof. Additionally, each order may also include a request for contractor information and/or a bid request for estimate costs and associated features of materials, supplies, physical labor, and the like.

Generally, in a step 145, customers using one or more user terminals 104 may provide user information to the first host system 102. The user information may then be used to prepare one or more user profiles for use in preparing the roofing report. Additionally, program logic 139 may generate a unique identification number and/or alpha numeric character to associate with the user profile.

The user information may include a location of the roof provided by the customer. For example, the customer may provide a residential and/or commercial address of the roof. One or more processors 108 may direct customers to validate the location of the roof using user terminals 104, in step 146. For example, processors 108 may provide one or more images via the image database 138. The images may be geo-referenced images illustrating portions or all of the roof. The program logic 139 may cause the processor 108 to provide users the one or more geo-referenced images, and allow the customer to validate the location of the roof. For example, the customer may be able to use a drag-and-drop element provided by the program logic 139 via user terminal 104 to select the roof within the one or more geo-referenced images. Selection of the roof within the one or more geo-referenced images may provide one or more validated images and a validated location of the roof. In some embodiments, the geographic location may include coordinates, and validation of the geographic location may be provided by a customer by altering one or more coordinates of the geographic location. Customers may alter the one or more coordinates by methods including, but not limited to, manual manipulation, drag-and-drop elements, and the like.

It should be understood that validation of the geo-referenced images may be provided by the second host system 126 via the one or more processors 128 in lieu of, or in combination with host system 102. For example, the first host system 102 may direct customers to the second host system 126 wherein the one or more processors 128 of the second host system 126 provide geo-referenced images from image database 141 to the customer for validation of one or more roof and/or roofing structures. As such, in some embodiments, only the second host system 126 provides geo-referenced images in the image database 141.

The first host system 102 may determine contractor availability within a region of interest about the validated location of the roof as shown in step 147. For example, program logic 139 may extract the validated location and compare the validated location against location of contractors in a region of interest. The region of interest may be determined by the customer via user terminal and/or the region of interest may be a pre-programmed determination. For example, the region of interest may be a five mile radius about the validated location. Contractor availability may include contractors having a contractor profile within the contractor database 137. Contractors within the contractor database 137 may be provided with a copy of the roofing report as described herein.

The program logic 139 may direct the one or more processors 108 to create and/or store a roofing order for the customer as shown in step 148. Additionally, the program logic 139 may direct one or more processors to transfer the roofing order to the second host system 126.

Figure 4:
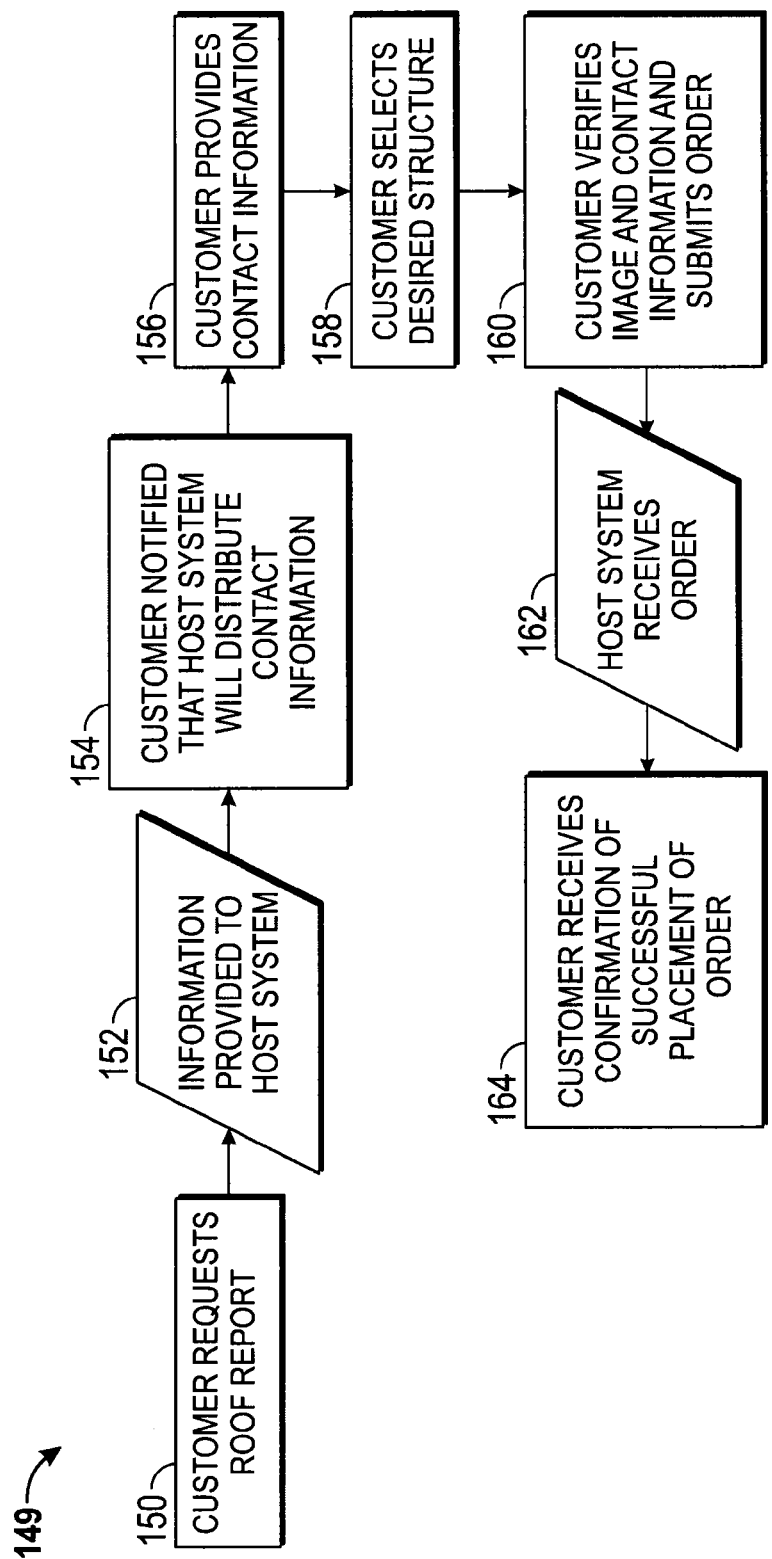
FIG. 4 is another exemplary embodiment of a program logic according to the instant disclosure.

FIG. 4 illustrates a flow chart 149 of an exemplary embodiment of the program logic 139 and/or 142 for processing a roof report order which may be used with the system 100 according to the instant disclosure. The program logic 139 comprises processor executable code, that when executed by the processor 108, may cause the processor 108 to execute one or more of the following:

The program logic 139 may include a step 150 wherein one or more user terminals 104 interfacing with the processor 108 over the network 106 may be provided with one or more websites having a mechanism allowing a customer to request a roof report. The customer may provide the request to the first host system 102 using the one or more websites, in a step 152. Prior to providing customer information, the customer may be notified that the first host system 102 may distribute any contact information provided by the customer to contractors provided within the first host system 102. The one or more processors 108 may provide the customer an option for agreeing to terms of service (e.g., distribution of their contact information), in a step 154.

In a step 156, the roof report request website may include queries regarding customer information including, but not limited to, customer name, address, address of the roof, billing information, and the like. The customer information may be provided by the one or more processors 108 and stored in the one or more memories 110. For example, the customer information may be provided by processors 108 as a user profile and stored in the user database 136 of the one or more memories 110.

Customers may be able to select the desired roof, location, and/or the like on the one or more websites provided by the processor 108 over the network 106, in step 158. For example, the customer may use the one or more user terminals 104 to provide a geographical location (e.g., address, latitude/longitude coordinates, or the like), a geo-referenced image, and/or an element within a geo-referenced image. Once the geographical location of the roof is selected, the processor 108 may provide a verification web page or similar mechanism for customer review and/or approval of a proposed order, in a step 160. The first host system 102 may receive the proposed order via the processor 108, store the order and/or transfer the order to the second host system 126 for processing, in a step 162. The processor 108 may provide a confirmation webpage or similar mechanism informing the customer of a successful order placement, in a step 164.

Figure 5:
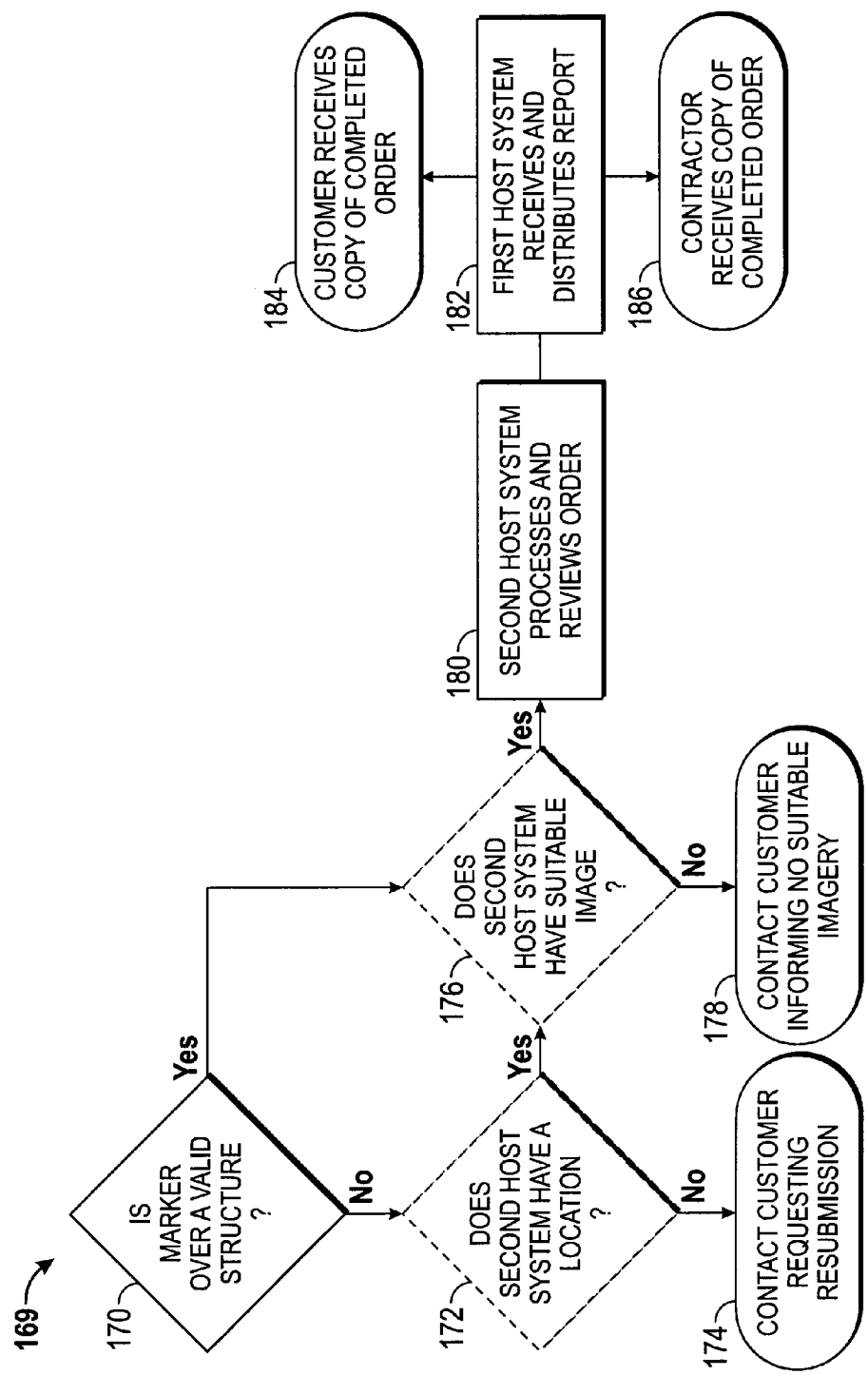
FIG. 5 is yet another exemplary embodiment of a program logic according to the instant disclosure.

FIG. 5 illustrates a flow chart 169 of an exemplary embodiment of the program logic 139 and/or 142 for providing a roof report which may be used with the system 100 according to the instant disclosure. Generally, processing of the proposed order may be provided using the second host system 126. The program logic 142 comprises processor executable code, that when executed by the processor 128, may cause the processor 128 to execute one or more of the following:

The second host system 126 may receive the proposed order via the one or more processors 108 of the first host system 102. Generally, the validity of the location of the roof provided by the customer may be determined, in a step 170. In a step 172, the second host system 126 may determine if the location of the roof provided by the customer exists. If the location is not found, the customer may be further contacted by the second host system 126 and/or the first host system 102 requesting resubmission or additional information for the proposed order, in a step 174. Additionally, in a step 176, the second host system 126 may determine if corresponding imagery within image database 141 exists for the location provided by the customer. If there is no corresponding imagery, the customer may be further contacted by the second host system 126 and/or the first host system 102 with a status message indicating no suitable imagery of the roof currently exists, in a step 178.

The second host system 126 may further process and review the order, in a step 180. An exemplary series of steps for implementing step 180 is shown in a flow chart 188 illustrated in FIG. 6. For example, the one or more processors 128 of the second host system 126 may receive the proposed order, in a step 190. The one or more processors 128 may extract order related information and images. Generally, a user may access a roof report website provided by the one or more processors 128 to review and/or process the proposed order. For example, the user may access the roof report website using the input devices 132 and the output devices 134 to review and/or process the proposed order.

In some embodiments, using the input devices 132 and/or the output devices 134, the user may provide additional details to the proposed order regarding the roof including, but not limited to, identification of areas of the roof (e.g., eaves, drip edges, ridges, and the like), pitch, distance, angle, and/or the like.

The footprint of the roof may be determined, in step 192. For example, the footprint of the roof may be determined using systems and methods including, but not limited to, those described in U.S. Patent Publication No. 2010/0179787, U.S. Patent Publication No. 2010/0110074, U.S. Patent Publication No. 2010/0114537, U.S. Patent Publication No. 2011/0187713, U.S. Pat. No. 8,078,436, and U.S. Ser. No. 12/909,692, all of which are incorporated by reference herein in their entirety In some embodiments, the one or more processors 128 may provide one or more websites to the user for evaluation of multiple oblique images to provide the footprint of the roof. For example, the user and/or the processors 128 may identify edges of the roof. Two-dimensional and/or three-dimensional information regarding the edges (e.g., position, orientation, and/or length) may be obtained from the images. Using the two-dimensional and/or three-dimensional information (e.g., position orientation, and/or length), line segments may be determined with multiple line segments forming at least a portion of the footprint of the roof.

Figure 7:
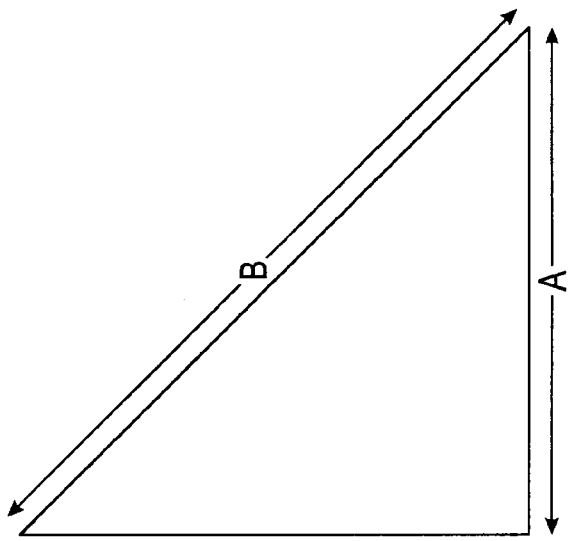
FIG. 7 is an exemplary slope factor chart for determining pitch factors according to the instant disclosure.

The footprint may provide a two-dimensional boundary and/or outline of the roof. In a step 194, a predominant pitch value for the roof may be determined. In some embodiments, a predominant pitch value may be determined using the footprint as a boundary of the roof. The predominant pitch may be a weighted average of individual pitch factors for two or more portions of the roof. FIG. 7 illustrates an exemplary slope factor chart for determining pitch factors. For example, a first portion of the roof (e.g., 60% of the roof) may be at a 6:12 pitch. The 6:12 pitch corresponds to 1.1180 as the pitch factor). A second portion of the roof (e.g. 40% of the roof) may be at a 4:12 pitch. The 4:12 pitch corresponds to 1.0541 as the pitch factor. Thus, the weighted value of the first portion of the roof having 6:12 pitch is:

(Pitch Factor)*(Percentage of roof)=First Weighted Value $$1.1180*0.6=0.6708 \qquad \text{EQ. 1}$$

The weighted value of the second portion of the roof having 4:12 pitch is:

(Pitch Factor)*(Percentage of roof)=Second Weighted Value $$1.0541*0.4=0.42164 \qquad \text{EQ. 2}$$

The sum of 0.6708 and 0.42164 is 1.09244 as the total weighted pitch value. A total weighted pitch value of 1.09244 is closest to a pitch factor of 1.0833 in the table in FIG. 7. This pitch factor corresponds to a 5:12 pitch. As such, the predominant pitch in this scenario would be 5:12. Using the predominant pitch and outer dimensions provided by the footprint, an estimated area of the roof may be determined, in a step 196.

In some embodiments, the user may review and reevaluate the estimated area of the roof obtained. For example, using the system and methods described herein, the user may review the steps for obtaining the footprint, the predominant pitch value, and/or estimated area. Additionally, the user may provide for a review report. The review report may comprise feedback to the one or more processors 128 regarding errors, concerns, and/or the like.

Figure 6:
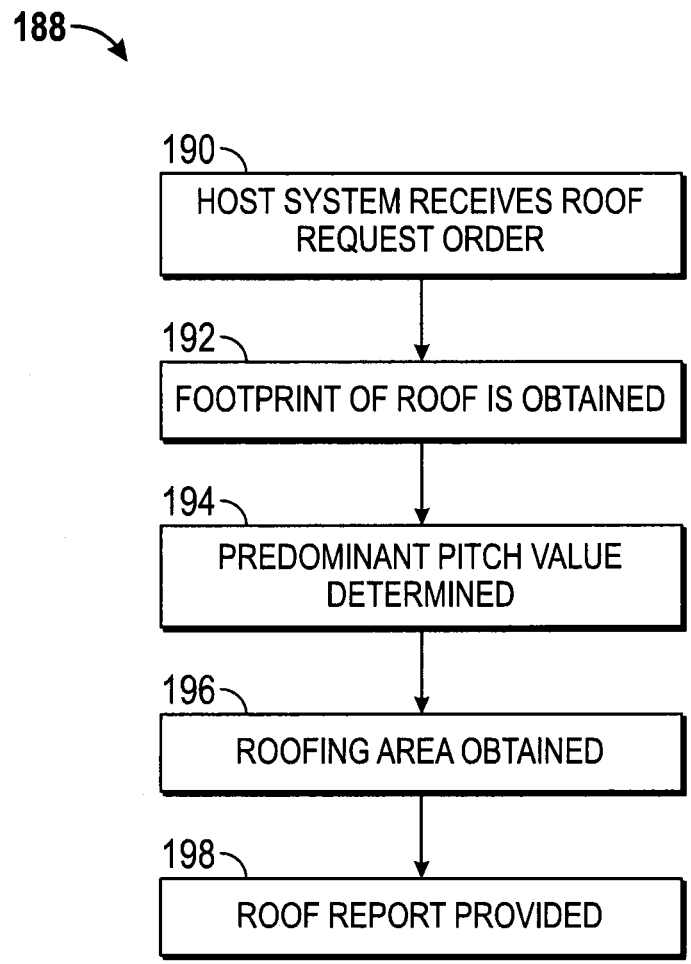
FIG. 6 is a further exemplary embodiment of a program logic according to the instant disclosure.
Figure 8:
FIG. 8 is an exemplary embodiment of a roofing report presentation page according to the instant disclosure.
Figure 8:
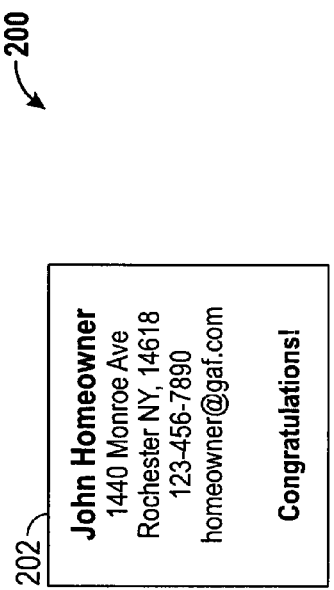
Figure 8:

Referring to FIGS. 1, 6 and 8, in a step 184 and 186, a customer and/or contractor may receive a roof report 200. FIG. 8 illustrates an exemplary embodiment of a roof report 200 provided in accordance with the present disclosure. The program logic 139 may provide for one or more user terminals 104 interfacing with the processor 108 over the network 106 to provide one or more roofing report website pages allowing customers and/or contractors to view the roof report 200.

Generally, roofing reports within the industry are detailed with data sets regarding pitch, total area, eave length, hip ridge length, valley length, number of box vents, and the like. The roof report 200 may be streamlined to generally include data sets such as customer information 202, roofing 204, estimated area detail 206, and contractor(s) 208. The customer information data set 202 may include the customer name, customer contact information, and the like. The roofing data set 204 may include one or more nadir images of the roof and one or more oblique images of the roof. The estimated area detail 206 may provide the total estimated roof area as determined using the second host system 126 described herein. The contractor data set 208 may include one or more contractor names and associated contractor contact information for the one or more contractor names.

The roof report 200 may be distributed using the first host system 102 and/or the second host system 126 to the one or more user terminals 104. For example, the roof report 200 may be distributed using the first host system 102 to a contractor at a first user terminal 104 and the roof report 200 may be distributed using the first host system 102 to the customer at a second user terminal 104.

In some embodiments, the first host system 102 and/or the second host system 126 may distribute the roof report 200 to one or more recipients in addition to, or in lieu of, the customer. For example, the roof report 200 may be distributed to recipients including, but not limited to, roof material suppliers (e.g., small roofing companies, Lowes, Home Depot, and the like), insurance companies, real estate agencies, home services and/or cleaning companies, insulation companies, auditing companies, and/or contractors. Contractors and/or suppliers may be associated with residential and/or commercial building elements and/or services including, but not limited to, fireplaces, pool sales, fencing, lawn maintenance, gardening, pavement resurfacing, decking, sunrooms, roofing, guttering, custom Christmas light designs, siding, windows, doors, garage doors, and the like.

In some embodiments, additional data sets may be included within the roof report 200. For example, data sets may include, but are not limited to, weather data, insurance/valuation data, census data, school district data, real estate data, and the like.

Weather data sets may be provided by one or more databases storing information associated with weather (e.g., inclement weather). A weather data set within the roof report 200 may include, but is not limited to, hail history information and/or location, wind data, severe thunderstorm data, hurricane data, tornado data, and/or the like. In some embodiments, the one or more databases providing weather information may be hosted by a separate system (e.g., LiveHailMap.com) and provide information to the first host system 102 and/or the second host system 126. The weather data set may be included within the roof report 200 and provided to the customer and/or other parties. In some embodiments, weather data sets may be provided within a report as described herein without the addition of roof related information (e.g., roofing data set 204).

Insurance and/or valuation data sets may be provided by one or more databases storing information associated with housing insurance and/or valuation. An insurance and/or valuation data set may include, but is not limited to, insured value of the home, insurance premium amount, type of residence (e.g., multi-family, single family), number of floors (e.g., multi-floor, single-floor), building type, and/or the like. In some embodiments, the one or more databases may be hosted by a separate system (e.g., Bluebook, MSB, 360Value) and provide information to the first host system 102 and/or the second host system 126.

The insurance and/or valuation data set may be included within the roof report 200 and provided to the customer and/or other parties. For example, during underwriting of a home, an insurance company may be able to request the roof report 200 on a home that is recently purchased. The information within the roof report 200 may be integrated with insurance information provided by an insurance database and used to form a quote report. The quote report may be sent to the customer and/or insurance company. Alternatively, the roof report 200 may be solely sent to the insurance company with the insurance company using the information to formulate a quote.

In another example, the roof report 200 may be used in an insurance claim. In the case of a catastrophe of a customer, one or more databases may be used to provide an insurance dataset with claim information in the roof report 200. For example, an insurance database having a policy in force (PIF) and a weather database may be used to correlate information regarding an insurance claim for a particular roof. This information may be provided within the roof report 200.

Real estate and/or census data sets may also be including within the roof report. The real estate and/or census data sets may be provided by one or more databases having detailed information of a home. For example, a real estate data set may include, but is not limited to, the homeowner's name, the purchase price of the home, number of times the home has been on the market, the number of days the home has been on the market, the lot size, and/or the like. The census data set may include information concerning the number of residents within the home. In some embodiments, the one or more databases may be hosted by a separate system (e.g., Core Logic) and provide information to the first host system 102 and/or the second host system 126 to provide data sets as described herein. The real estate data set may be included within the roof report 200 and provided to the customer and/or other parties.

The roof reports 200 may include roofing data as described herein; however, system 100 may be used to provide other information to a customer and/or other party without roof related information (e.g., roofing data set 204). For example, in a real estate transaction, one or more databases in host system 102 and/or host system 126 may include recent home sales over time in one or more geographic areas. The footprint of each home and home valuation may be provided in one or more databases within host system 102 and/or host system 126. Using the systems and methods described herein, a customer (e.g., homeowner) may request a report determining approximate sales price of a home using the footprint and/or valuation versus comparables within the geographic area. The report may provide an approximate sale price of the home. In some embodiments, demographics of the homeowners may be used and stored in one or more databases. The demographic information may be used for potential advertising and/or comparables within the geographic area. In another example, using systems and methods as described herein, a report may be provided for housecleaning and/or home services area (e.g., fireplace cleaning, pool sales, fencing, lawn maintenance/gardening, pavement resurfacing, decking, sunrooms, roofing, guttering, custom Christmas light designs, siding, windows, doors, garage doors, and the like). For example, using a footprint of a home, number of stories within a home, and the like, a determination of average square footage within a home may be determined. This information may be used to formulate a price quote for cleaning services.

Other services related to roofing may be provided within the roof report 200. For example, using the square footage of the roofing footprint, a price quote may be generated on the cost of insulation for the roof (e.g., energy efficiency, insulation replacement, and the like). Additionally, audits may be performed using information within one or more databases. For example, using the roofing area of a home, historically paid insurance claims for comparables, and validation of payment for a specific claim for the home, a comparison may be made to determine whether the service payment for the specific claim was within a certain threshold. Auditing, it should be understood, may be applied to other areas as described herein as well.

Although the terms "home" and "house" are used herein, it should be noted that the systems and methods in the present disclosure may be applied to any residential and/or commercial building or structure.

From the above description, it is clear that the inventive concept(s) disclosed herein is well adapted to carry out the objects and to attain the advantages mentioned herein as well as those inherent in the inventive concept(s) disclosed herein. While presently preferred embodiments of the inventive concept(s) disclosed herein have been described for purposed of this disclosure, it will be understood that numerous changes may be made which will readily suggest themselves to those skilled in the art and which are accomplished within the scope and spirit of the inventive concept(s) disclosed herein and defined by the appended claims.

What is claimed is:

1. One or more non-transitory computer readable medium storing a set of computer executable instructions for running on one or more computer systems that when executed cause the one or more computer systems to: identify a geographic location of a roof; determine a footprint and predominant pitch of the roof by analyzing one or more image showing the roof; determine an estimated roofing area of the roof based on the predominant pitch and the footprint of the roof; and generate a roof report for determination of an amount of materials needed for a construction project, wherein the roof report includes at least one image showing the roof and the estimated roofing area of the roof.

2. The one or more non-transitory computer readable medium storing a set of computer executable instructions for running on one or more computer systems of claim 1, that when executed further cause the one or more computer systems to determine contact information of one or more contractors within a region of interest of the geographic location of the roof, and to provide a roof report, wherein the roof report includes one or more ortho images of the roof, one or more oblique images of the roof, the estimated roofing area and the contact information of one or more contractor within the region of interest of the geographic location of the roof.

3. The one or more non-transitory computer readable medium of claim 2, wherein the roof report includes contact information of the customer.

4. The one or more non-transitory computer readable medium of claim 1, wherein the one or more non-transitory computer readable medium comprises a first non-transitory computer readable medium of a first host system and a second non-transitory computer readable medium of a second host system.

5. The one or more non-transitory computer readable medium of claim 1, wherein identifying the geographic location of the roof further comprises obtaining contact information of a customer.

6. The one or more non-transitory computer readable medium storing a set of computer executable instructions for running on one or more computer systems of claim 1, that when executed further cause the one or more computer systems to receive customer input to validate geographic location of the roof.

7. The one or more non-transitory computer readable medium of claim 6, wherein the geographic location includes coordinates and validation of the geographic location includes instructions for receiving customer input to alter one or more coordinates of the geographic location.

8. The one or more non-transitory computer readable medium of claim 1, wherein identifying a geographic location of the roof includes identifying one or more edges of the roof in an image.

9. The one or more non-transitory computer readable medium storing a set of computer executable instructions for running on one or more computer systems of claim 1, that when executed further cause the one or more computer systems to identify edges of the roof; determine three-dimensional information of the edges including position, orientation and length using multiple oblique images from multiple cardinal directions; and, determine, automatically, one or more line segments forming a portion of a footprint of the roof utilizing position and orientation of the edges.

10. The one or more non-transitory computer readable medium of claim 1, wherein determining the predominant pitch includes determining a plurality of pitch values with each pitch value associated with a portion of the roof, the predominant pitch based on the plurality of pitch values.

11. The one or more non-transitory computer readable medium of claim 10, wherein each pitch value is associated with an estimated percentage of roof area to provide an average pitch value.

12. The one or more non-transitory computer readable medium storing a set of computer executable instructions for running on one or more computer systems of claim 1, that when executed further cause the one or more computer systems to provide the roof report to one or more contractors, the contractor located within the region of interest of the geographic location of the roof.

13. A system, comprising:
two or more host systems, each host system having one or more non-transitory computer readable medium;
the non-transitory computer readable medium of the first host system storing a set of computer executable instructions that when executed by one or more processors causes the one or more processors to:
identify a geographic location of a roof;
determine contact information of at least one contractor within a region of interest about the geographic location of the roof;
the non-transitory computer readable medium of the second host system storing a set of computer executable instructions that when executed by one or more processors causes the one or more processors to:
determine a footprint and predominant pitch of the roof by analyzing one or more image showing the roof;
determine an estimated roofing area based on the predominant pitch and the footprint of the roof; and,
generate a roof report for determination of an amount of materials needed for a construction project, wherein the roof report includes one or more ortho images of the roof, one or more oblique images of the roof, the estimated roofing area and contact information of one or more contractors within the region of interest.

14. A roofing estimate method, comprising:
receiving, by at least one computer processor from a user via a user terminal, a geographic location of a roof;
providing to the user, with the computer processor, imagery of the roof based on the geographic location of the roof;
determining and providing, with the computer processor, an estimated roofing area based at least on a predominant pitch and a footprint of the roof by analyzing one or more image showing the roof, the footprint of the roof determined at least in part using at least one image of the roof; and generating, with the computer processor, a roof report for determination of an amount of materials needed for a construction project, wherein the roof report includes at least one image showing the roof and the estimated roofing area of the roof.

15. The roofing estimate method of claim 14, wherein the roof report further includes contact information of one or more contractor within a region of interest of the geographic location of the roof.

16. The roofing estimate method of claim 14, wherein the footprint of the roof is determined at least in part with oblique images of the roof.

17. The roofing estimate method of claim 14, wherein the predominant pitch value of the roof based at least in part on the footprint of the roof as a boundary of the roof.

18. The roofing estimate method of claim 14, wherein the predominant pitch is based on a weighted average of individual pitch factors for two or more portions of the roof.

* * * * *